UNITED STATES PATENT OFFICE.

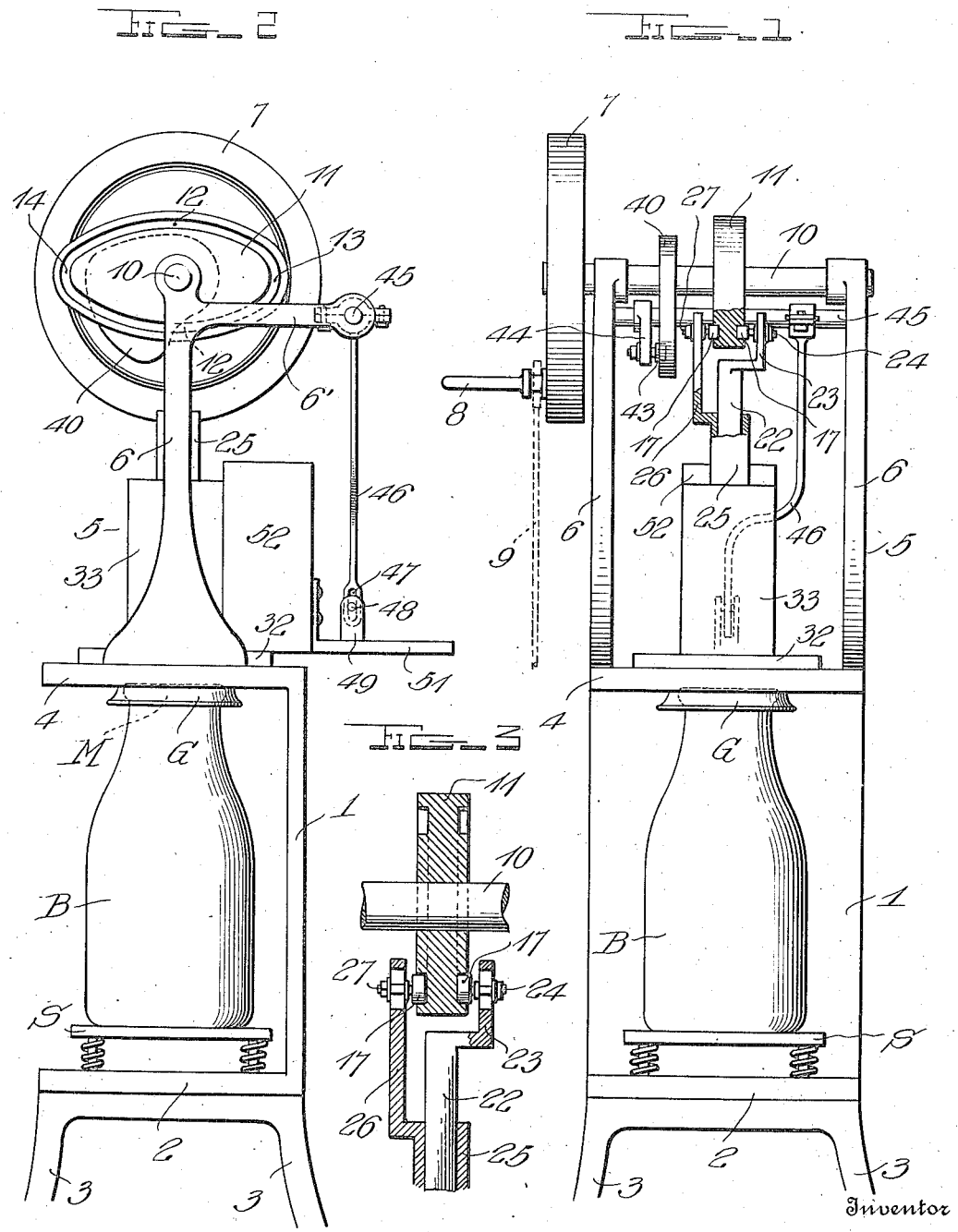

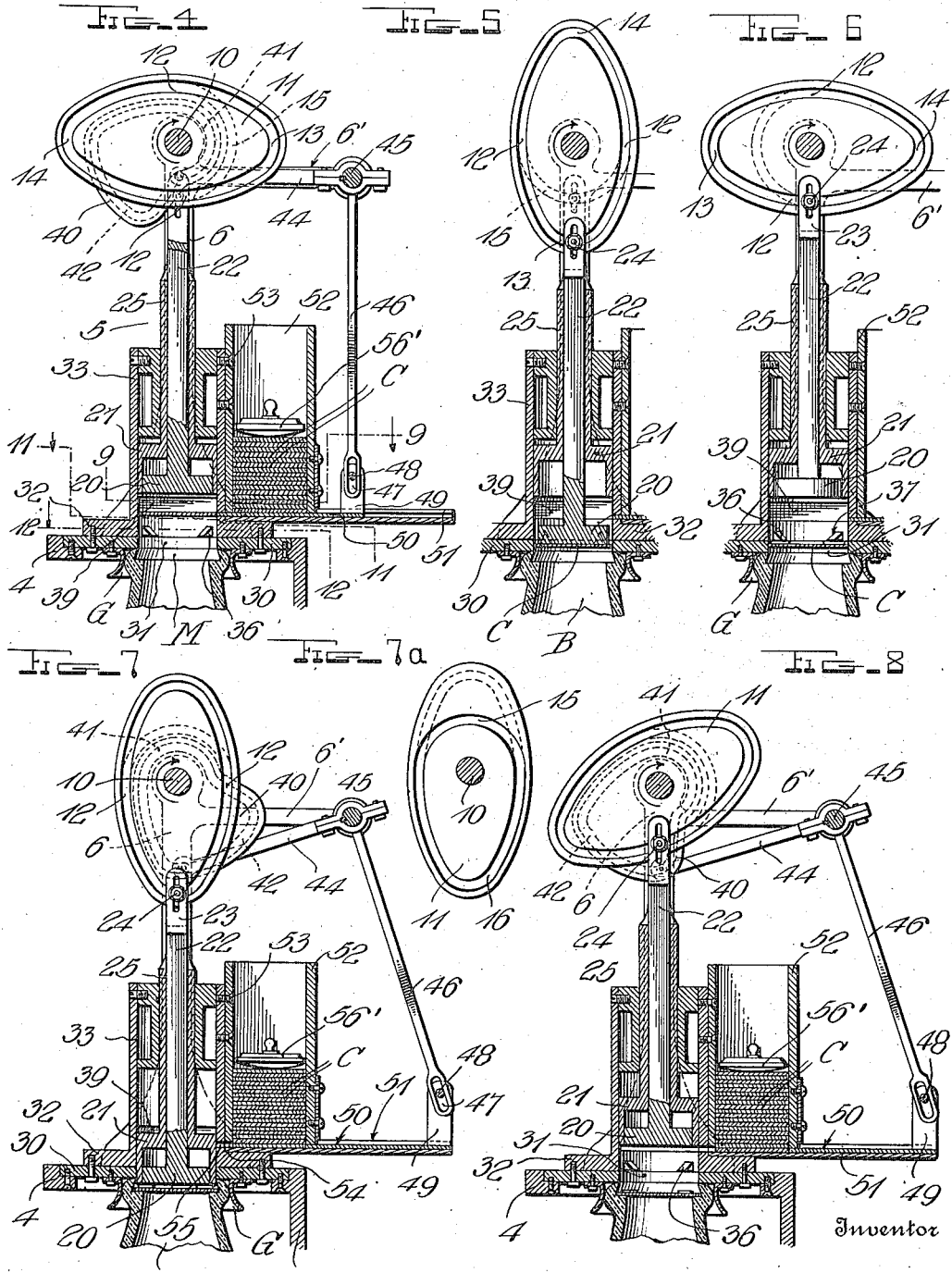

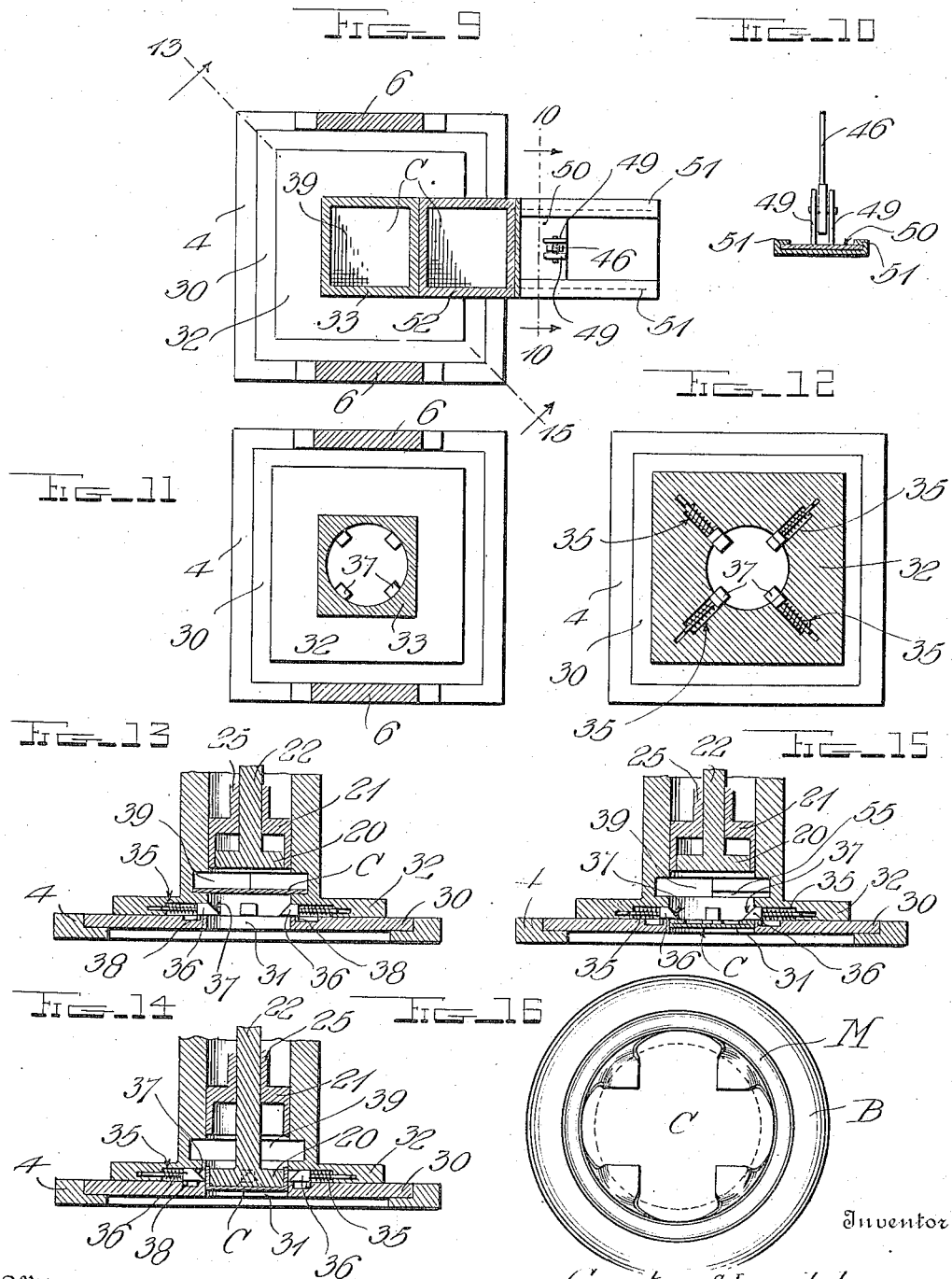

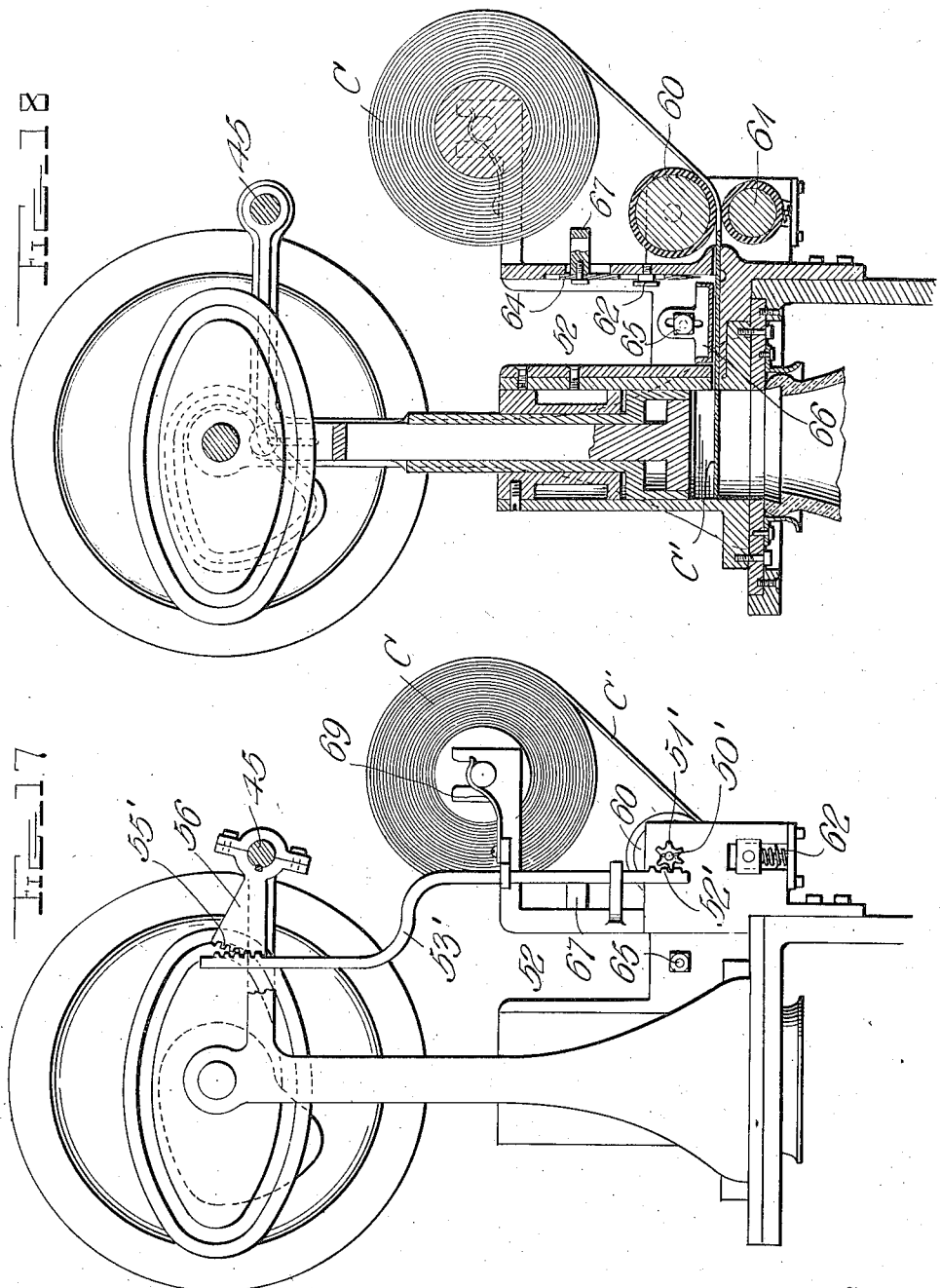

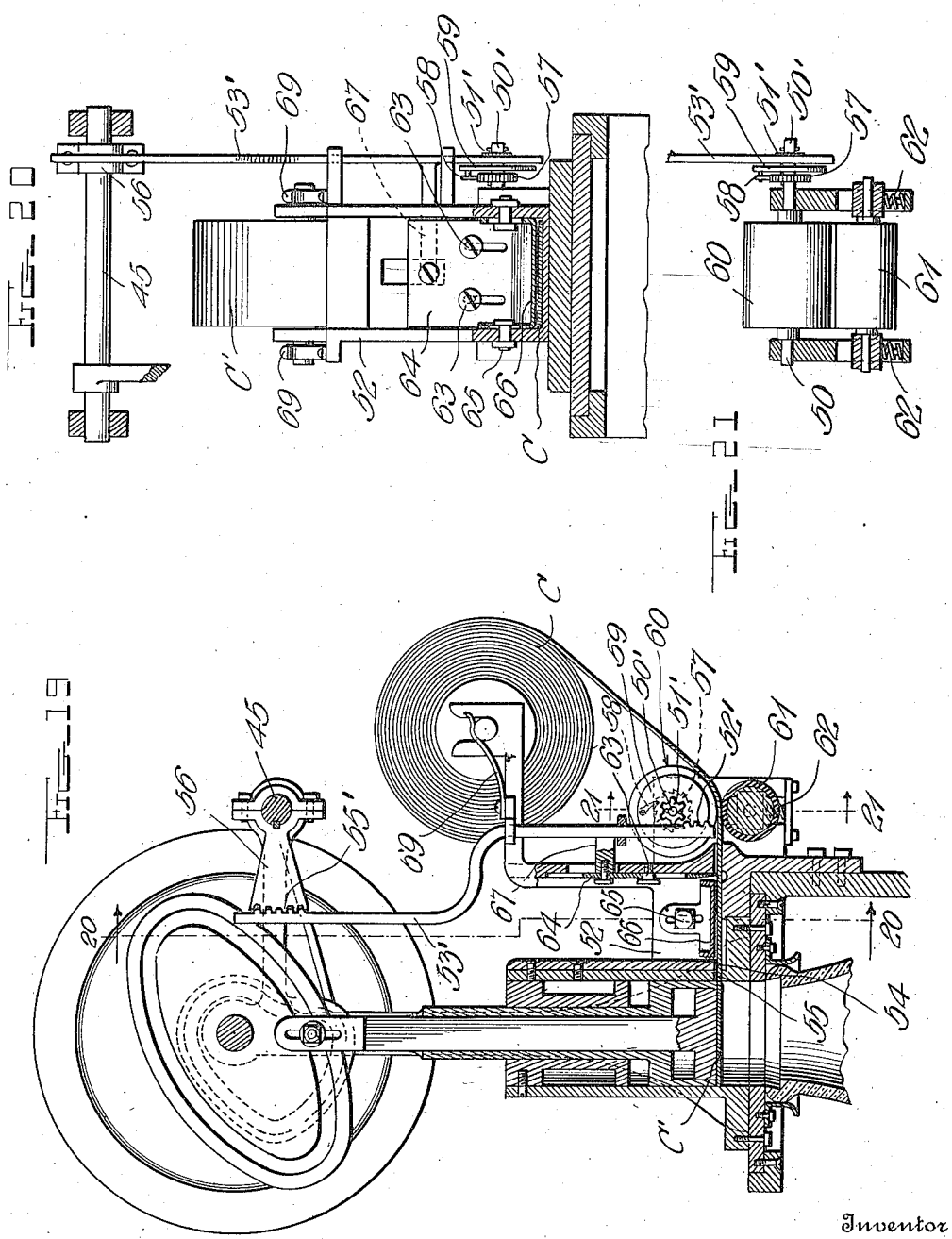

GUSTAV G. LOEHLER, OF WASHINGTON, DISTRICT OF COLUMBIA.

BOTTLE-CAPPING MACHINE.

1,134,626.  Specification of Letters Patent.  Patented Apr. 6, 1915.

Application filed August 19, 1913.  Serial No. 785,588.

*To all whom it may concern:*

Be it known that I, GUSTAV G. LOEHLER, a citizen of the United States, residing at Washington, in the District of Columbia, have invented certain new and useful Improvements in Bottle-Capping Machines; and I do declare the following to be a full, clear, and exact description of the invention, such as will enable others skilled in the art to which it appertains to make and use the same.

This invention relates to packaging liquids, and more especially to means for inserting the paper or pasteboard cap into the mouth of bottles such as those which contain milk; and the object of the same is to produce a simple and yet reliable machine of this character wherein the bottle caps are fed automatically to the capping mechanism while the machine is running.

This and other objects are carried out by constructing the device in the manner hereinafter more fully described and claimed and as shown in the drawings wherein:—

Figure 1 is a front elevation and Fig. 2 a side elevation of one form of this machine. Fig. 3 is an enlarged vertical sectional view through the cam and the upper ends of the rods operated thereby. Figs. 4 to 8 are vertical sections showing the parts in different positions as will be referred to hereinafter. Fig. 7ᵃ is a detail of the opposite side of the main cam from that shown in Fig. 7. Fig. 9 is a section substantially on the line 9—9 of Fig. 4. Fig. 10 is a detail sectional view taken substantially on the line 10—10 of Fig. 9. Fig. 11 is another detail, taken substantially on the line 11—11 of Fig. 4, and Fig. 12 is a similar section on about the line 12—12 of Fig. 4. Figs. 13 to 15 inclusive are sectional details, taken approximately on the line 13—15 of Fig. 9. Fig. 16 is a plan view of the bottle with the cap in place. Fig. 17 is a side elevation of another form of my invention, and Fig. 18 a central vertical sectional view through Fig. 17. Fig. 19 is a sectional view of this form of my invention partly in side elevation and with the parts in another position. Fig. 20 is a vertical section approximately on the line 20—20 of Fig. 19, and Fig. 21 a detail in section approximately on the line 21—21 of Fig. 19.

I may say in starting that this is a machine for applying to the mouths of bottles or jars, and more especially milk-bottles, the stopper or cap forming the subject matter of my U. S. Patent No. 1,028,040, dated May 28, 1912. It will be sufficient for the purposes of the present specification to state that this cap is made from a square blank which, in the act of being forced into the round mouth of the bottle, has its corners upset so that in effect it becomes first octagonal, and as the cap in this shape is driven home onto the shoulder in the bottle-mouth, its eight corners are crimped or jammed inward so that the contour of the blank which was originally square now becomes round and the crimped corners hold it very reliably within the bottle-mouth.

On the drawings herewith and in the following specification I illustrate and describe my machine in two types, in one of which first to be described below the caps are cut into the shape of square blanks and placed in a hopper from which they are fed one by one into the capping mechanism proper, and in the other of which forms of my invention the stiff paper or cardboard from which the caps are to be made is supplied in form of a reel or roll and is fed intermittently to the capping mechanism proper and cut off into square blanks by a knife which is obviously not necessary with the first form of my invention. In either case the result is that it is a strictly square blank which is handled by the capping mechanism so that in the act of driving this blank into the bottle-mouth, the above described results follow and the cap is wedged into place with sufficient firmness to cause it to remain.

I have illustrated the machine as adapted to be driven by hand with a crank on its main or power wheel, and in dotted lines I have shown how this crank might carry a rod which could lead downward to a pedal so that the device could be driven by foot-power, but it is obviously unimportant what is the source of power. However, as the machine to be described is designed for the use of comparatively or relatively small customers who might not care to purchase a power-driven machine as their use for it is not sufficient, this detail is unimportant. In so small a machine the bottle is put in place and removed by hand, but it is quite possible that with a larger machine having greater capacity and therefore where the speed of operation would be higher, means might be provided to insert and remove the bottles mechanically, although this would be but an amplification of the idea which forms no part of the present invention.

I do not wish to be limited to the details strictly as set forth below, nor to the proportions and materials of parts.

While I have shown and described two forms of feed-mechanism, any suitable feeding devices or machinery could be used, but those illustrated and described are best adapted to a small machine as shown, and I could not say which type of feeding mechanism I prefer. The capping mechanism is identical in both cases, save as to the slight modifications necessary to adapt it to the feeding mechanism.

Finally, while I have described and do intend this machine to be used for the insertion of paper or pasteboard caps in the mouth of milk-bottles, it is quite possible that it could be used on heavier stock and with receptacles whose mouths were larger or smaller than shown here.

Referring first to the type of my invention shown on the first three sheets of the drawings, I will use the letter B to designate the bottle having a mouth M to receive the cap C, and the letter S to denote a yielding support for said bottle which is depressed as the latter is put into place between guides G around its mouth. Said support is mounted on the base 2 of a frame 1 which is carried on suitable legs 3, and above the base the frame carries a table 4 which supports the head 5 of the machine. This head carries the feeding and capping mechanisms the moving parts of which are mounted in standards 6 of the framework or upon the table 4, and the driving or power wheel 7 is herein shown as having a crank 8 by means of which it may be rotated by hand, although a rod 9 might extend downward from said crank to a pedal (not shown) so that this power wheel could be rotated by the foot of the operator. However, as above suggested, if the machine were of larger size it is quite possible that the power wheel could be driven by a belt or could be connected by gearing with any suitable source of power; but with a small machine as will be described below, a crank wheel is sufficient. As also above suggested, the mechanism within the base of the frame is described below as of a construction adapting the bottles B to be inserted and removed by hand, but this could be replaced by automatic mechanism if the machine were larger.

The main shaft 10 which is mounted in bearings on the standards 6 carries a cam 11 having differently-shaped cam-grooves in its opposite faces. One of these grooves is substantially elliptical as shown in Figs. 4 to 7 inclusive, its lower points 12 being equidistant from the center of the shaft 10 and distant from the center of the shaft 10 and its high points 13 and 14 being somewhat farther remote from said center but to a slightly different degree so that the point 14 is the highest of any point in the cam—all this being for a purpose to appear below. The cam groove on the opposite face of the cam (see Fig. 7ª) has a low portion 15 which is concentric with the axis of the shaft 10, and a high portion 16 as shown. Rollers 17 travel in these grooves as illustrated, but it is quite obvious that the cam faces could project from the body of the cam and the upper ends of the rods to be actuated thereby would then be shaped accordingly, and it is also obvious that the rollers might be omitted or replaced by other anti-friction devices.

The plunger for inserting the caps in the bottle mouth M acts in the nature of a piston reciprocating within a cylinder, but it is made up of two parts or members which I will term "heads" and whereof one is driven by each cam. The solid head 20 is round and is of a size and shape to be received within the cupped head 21. The former is secured to the lower end of a solid square rod 22 which has an elbow or offset 23 at its upper end, carrying a pin 24 (preferably provided with one of the rollers) engaging the elliptical cam; while the cupped head 21 is mounted at the lower end of a tubular rod 25 having a square bore slidably receiving the solid rod 23, and this tubular rod has an offset or elbow 26 at its upper end carrying a pin 27 which (or the roller thereon) enters the other or irregular cam groove best seen in Fig. 7ª. By this construction it will be seen that the cams and rods operate the heads independently of each other, although the square rod 22 is guided in the square bore of the tubular rod 25 so that the round solid head 20 remains ever in axial alinement with the cup within the hollow head 21, even if it is projected below and out of the same as seen in Fig. 5 and as described below. If the cams be in the shape of grooves as shown or ribs as suggested, rather than faces on the edge of the cam-body, no springs are necessary for raising the piston-heads, and I would prefer the construction shown and described because the omission of springs makes the machine simpler.

Inset into the table 4 is a plate 30 which may conveniently carry the guides G at the sides of an opening 31 in the plate disposed directly above the mouth M of the bottle B and beneath the piston above described. Secured upon said plate is the base 32 of an upstanding cylinder 33 within whose bore said hollow head is slidably mounted as shown, the axis of said bore being disposed directly beneath the center of the power shaft 10 as seen in Fig. 4 and by preference directly beneath the center of the cam 11 as seen in Fig. 1. Said base 32 is in the form of a radial flange of considerable size, and within it are four sockets or recesses (see Figs. 12 to 15) 35 in each of which is a spring-actuated dog 36 having its tip or inner end beveled on the upper side as at 37, the spring throwing the dog normally inward to the position shown in Fig. 13 beyond which its inward movement is limited by any suitable stop 38. These recesses and dogs are placed in the corners of the square base as seen in Fig. 12 and beneath the corners of a square chamber 39 which is formed within the bore of the cylinder, the shortest diameter of said chamber being coincident with the diameter of its round bore as indicated in Fig. 11 and the beveled tips of the dogs projecting normally into said round bore beneath the chamber 39 and above the opening 31 in the base 32.

The operation of my machine as far as has been described is as follows: If a blank C be placed within the chamber 39 and rotary movement imparted to the main shaft 10, with the parts standing in the position shown in Fig. 4, the high point 13 of the cam 11 first depresses the solid head and the blank is shoved out of the chamber and forced downward into the cylinder-bore below it as seen in Figs. 5 and 14. This action of course upsets the corners of the square blank as the latter is driven out of a square chamber into a round portion of the bore beneath it, and said upset corners travel over the tips of the dogs as they lie against the side of the solid head 20, with the result that said dogs are pressed outward as best seen in Fig. 14. The cam 11 continues its rotation until the high point 13 moves to the position shown in Fig. 6, and the succeeding low point 12 retracts or raises the solid head to its original position within the cupped head 21 as shown in this view and in Fig. 13; but as soon as the solid head rises the dogs fly inward under the impulse of their springs as seen in Fig. 15 and the upset corners of the blank are turned down as therein shown. The cam 11 continues its rotation until the high point 14 comes into action as seen in Fig. 7 and this again depresses the solid head 20 so that the bottle-cap—already formed as just described—is now forced down into the mouth end of the bottle. The high portion 16 of the opposite cam co-acts with and is opposite to the high point 14 of the elliptical cam, with the result that the cupped head 21 is caused to descend with the solid head at the second impulse of descent of the latter, so that as the cap is placed within the mouth of the bottle it is driven by the combined action of both heads as seen in Fig. 7, and is therefore very firmly seated. However, the shell of the cupped head 21 as it descends, acts on the beveled tips 37 of the dogs 36 and forces them outward as will be clear from an inspection of this view. The cam 11 now continues its rotation to its original position, and the low points 12 and 15 of the two cam grooves raise both heads so that they stand as they did at the beginning and as seen in Figs. 4 and 13. Therefore a single revolution of the power or main shaft and its cam results in two impulses of the solid head 20, the first serving to upset the corners of the square blank and reduce it to a round shape, and the second impulse causing this head, assisted by the other, to push the round blank into the mouth of the bottle, while the dogs hold said upset corners in position above the body of the cap in the meantime. It will be clear that on the first movement downward of the solid head the square blank is made round in its configuration, and on the recession of this head the dogs bear down the upbent corners, while on the second descent of the solid head surrounded by the cupped head the blank which then had the shape shown in Fig. 15 is pushed down a little farther (by reason of the extreme height of the point 14 in the cam 11) and the rim of the cupped head compresses said corners and the points at either side where the material is crimped and flattens them out on the shoulder within the mouth end of the bottle, because the latter is sustained firmly by springs beneath its support S. The purpose of these springs is primarily to adapt the support to a bottle which may be a little too tall, and it is therefore obvious that any yielding means for securing the support could be employed.

The feeding mechanism for supplying square blanks to the capping mechanism proper which has already been described, may be any which will successfully perform the work in conjunction with this machine. I have shown one type of said feeding mechanism on Sheets 1, 2 and 3 of the drawings and another type on the remaining sheets. Referring now to Sheets 1, 2 and 3, the numeral 40 designates a cam mounted on the shaft 10 and having a low point 41 and a high point 42, the same being by preference formed—as in the case of the other cam—in the shape of a groove cut in the face of the cam; and said cam groove receives a roller 43 on an arm 44 which is secured upon a rock shaft 45 whose extremities are journaled in suitable bearings mounted in extensions 6' of the standards 6 of the frame. Depending rigidly from said rock shaft 45 is a swinging arm 46 having in its lower end a slot 47 loosely engaging a pin 48 connecting two ears 49 which rise from a horizontally sliding plunger 50. The latter is mounted in guides 51 which are suitably carried by a hopper 52 that is in turn secured to one side of the cylinder 34 as seen at 53 in Fig. 4. The slide or plunger 50 moves across the lower end of said hopper, through a slot 54 in its inner wall as seen in Fig. 7, through a registering slot 55 in the contiguous wall of the cylinder 34, and to a point flush with the nearest wall of the square chamber 39 as shown. When now a series of square blanks C are disposed within this hopper, preferably beneath a suitable weight 56', it is obvious that at each forward impulse of the plunger the lowermost blank in the stack will be pushed through the slots 54 and 55 and into the chamber 39; and the shape of the cam 40 is such as to rock the shaft 45 and accomplish this result just at the proper time with respect to the movement of the capping mechanism as above described. The cam 40 as shown in Fig. 8 is of such shape and of such disposition relative to the cam 11 that as the two heads 20 and 21 are rising from their position shown in Fig. 7 the roller 43 is traveling in the groove of the cam 40 at the point where it is most remote from the shaft 10, but as said heads pass the inner slot 55 the cam actuates the arm 44 and retracts the swinging arm 46 so that the lowermost cap in the stack drops in front of the plunger 50, when the cam causes the movement of the shaft 45 to swing the arm 46 as shown in Fig. 4 and the plunger projects a new cap across the chamber 39 ready to be acted on by the descent of the solid head as shown in Fig. 5.

With the construction shown on sheets 4 and 5 of the drawings, the same rock shaft 45 is employed but the swinging arm 46 is replaced by a segment 56 having teeth 55' on its periphery engaging other teeth on a sliding rod 53' the same moving through suitable guides and having other teeth 52' near its lower end so that in effect it is a rack bar by which term I will so call it hereinafter. The lowermost teeth 52' engage a gear 51' which is mounted loosely on a shaft 50 alongside a ratchet wheel 57 fast on said shaft as seen in Fig. 21, and a pawl 58 engaging said ratchet wheel is carried by the gear 51' in any suitable manner, or by means of a disk 59 secured to one end of the gear and to which the pawl is pivotally mounted. Said shaft 50' carries a feed roller 60 standing above and co-acting with a companion roller 61 which may be spring supported as at 62 in Fig. 21, and between these rollers moves a strip C' of paper which may be unwound from a roll or reel C". It will be obvious that if the parts are properly constructed, a movement of the rack bar in one direction will rotate the gear 51' and the disk 59 and move the pawl 58 over the ratchet wheel, whereas a movement of the rack bar in the other direction will cause said pawl to turn the ratchet wheel 57 and with it the feed roller so that the paper is projected toward the capping mechanism above described.

I have shown the chamber 52ᵃ as employed in Fig. 19 and a guide 56 disposed therein and rendered adjustable by a slot and set screw as indicated at 65, and as the paper strip C' is led forward step by step it passes beneath this guide and across the bottom of the hopper, thence through the alined slots 54 and 55, and into the cylinder. This type of feed mechanism, however, requires that the strip C' be cut into square blanks C, and for this purpose I have employed a knife 64 moving over a suitable slot-and-pin guide 63 along the rear or outer wall of the hopper, and connections 67 between said knife and rack bar whereby the descent of the latter will cause the descent of the knife and the severing of the paper strip. The ascent of the rack bar will, however, feed the strip forward so that the piece cut off will be projected from beneath the hopper into the chamber within the cylinder in the manner above described. The roll C" mounted in suitable supports, and its trunnions are subjected to proper tension as by means of springs 69. Thus it will be seen that this type of my invention contemplates the use of stock which comes in the form of a roll or reel, or in other words is a wound strip of paper or cardboard rather than square blocks of the same, although in effect it is cut into said blocks by the feed mechanism as described. For this reason it may be said that this type of feed mechanism includes a cutting device which converts the strip into blocks or blanks, since it is only in the latter case that the cap can be acted on by the capping mechanism of my invention. I may add that the details of this type of the feed mechanism are susceptible of considerable variation, especially with respect to the pawl-and-ratchet mechanism between the reciprocating rack bar and the intermittently operating feed wheel, and in fact it is quite possible to depart rather widely from the illustration, so long as there are suitable connections between the main shaft and said feed roller for turning the latter in steps which are timed with relation to the movement of the capping mechanism, and some provision is made to cut off the strip.

What is claimed as new is:

1. In a bottle capping machine, the combination of a cylinder having a polygonal chamber, a piston head movable in said cylinder, and means for depressing said head across said chamber, then retracting it, and then depressing it on the next impulse to a lower point and spring pressed blank engaging means mounted to move in a plane at right angles to the plane of movement of said piston head and adapted to operate between the two depressing movements of said head.

2. In a bottle capping machine, the combination of a cylinder having a polygonal chamber, a piston head movable in said cylinder, means for depressing said head across said chamber, then retracting it, and then depressing it on the next impulse to a lower point, and blank engaging means mounted to move in a plane at right angles to the plane of movement of said piston head and adapted to operate between the two depressing movements of said head.

3. In a bottle capping machine, the combination of a cylinder having a polygonal chamber, a piston head movable in said cylinder, means for feeding a polygonal blank into said chamber, means for depressing said head across said chamber, then retracting it and then depressing it on the next impulse, and means mounted to move in a plane at right angles to the plane of movement of said piston head and adapted to operate between the two depressing movements of said head to engage the corners of said blank and force them inward into position to be engaged and depressed by the piston head on its second depressing movement.

4. In a bottle capping machine, the combination with an upright cylinder having a round bore and a polygonal chamber across said bore between its ends; of a round piston head within said bore, and means for depressing it across the chamber, then retracting it, and then depressing it on the next impulse to a lower point and means mounted to move in a plane at right angles to the plane of movement of said piston head and adapted to operate between the two depressing movements of said head.

5. In a bottle capping machine, the combination with an upright cylinder having a round bore and a square chamber across said bore between its ends; of a round piston head within and smaller than said bore, means for feeding a square blank into said chamber, means for depressing said head across the chamber, then retracting it, and then depressing it on the next impulse to a lower point so as to eject the blank, and means mounted to move in a plane at right angles to the plane of movement of said piston head and adapted to operate between the two depressing movements of said head, said means being positioned for engaging the corners of said blank on their inward movement.

6. In a bottle capping machine, the combination with an upright cylinder having a round bore and a square chamber across said bore between its ends, and a slot through its wall communicating with said chamber, and intermittently actuated mechanism for feeding square blanks through the slot into the chamber; of a piston head within and smaller than said bore, a shell shaped to fill the space between the head and bore, and means for depressing said head across the chamber after an impulse of the feed mechanism, then retracting it, and then depressing the head and with it the shell to a lower point so as to eject the blank.

7. In a bottle capping machine, the combination with an upright cylinder having a round bore and a polygonal chamber across said bore, and a slot through its wall communicating with the lower portion of said chamber, and intermittently actuated mechanism for feeding polygonal blanks through the slot into the chamber; of a round piston head within and smaller than the bore, a shell slidably mounted in the bore and shaped to receive said head, means for depressing said head across the chamber after an impulse of the feed mechanism, then retracting it, and then depressing the head and with it the shell to a lower point, and devices within said bore below the chamber for engaging the corners of the blank which are upbent by the first descent of the head.

8. In a bottle capping machine, the combination with an upright cylinder having a round bore and a polygonal chamber across said bore, and a slot through its wall communicating with the lower portion of said chamber, and intermittently actuated mechanism for feeding polygonal blanks through the slot into the chamber; of a round piston head within and smaller than the bore, a shell slidably mounted in the bore and shaped to receive said head, means for depressing said head across the chamber after an impulse of the feed mechanism, then retracting it, and then depressing the head and with it the shell to a lower point, said cylinder having radial recesses opening through the wall of its bore opposite the angles of its chamber, and spring-actuated dogs in said recesses having their inner ends beveled on their upper sides, for the purpose set forth.

9. In a bottle capping machine, the combination with an upright cylinder having a round bore and a square chamber across said bore between its ends, and a slot through its wall communicating with said chamber, and means for feeding square blanks through said slot; of a cup-shaped head slidably mounted within said bore, a solid head slidably mounted within said cup, means for depressing the solid head across the chamber and then retracting it to a position within the cup, means for depressing the assembled heads to a lower point in the bore for ejecting the blank, and yielding means for holding the bent corners of the blank between the impulses of the solid head and for releasing them upon the descent of the cupped head.

10. In a bottle capping machine, the combination with an upright cylinder having a round bore and a square chamber across said bore between its ends, and a slot through its wall communicating with said chamber, and means for feeding square blanks through said slot; of a cup-shaped piston head slidably mounted within said bore, a tubular rod rising therefrom and having an angular bore, a solid piston head slidably mounted within said cup, a solid rod rising therefrom and fitting slidably in said angular bore, cams acting on said rods to depress the solid head across said chamber and then to retract it to a position within the cup and the next to depress both heads to a lower position in the bore for ejecting the blank, and means for holding the bent corners of the blank between the impulses of the solid head.

11. In a bottle capping machine, the combination with a table having a plate inset in its top and provided with a round hole, a cylinder having a base secured upon said plate and a round bore alining with said hole, the bore being provided with a square chamber across it and the cylinder wall having a slot communicating with said chamber and radial recesses alined with the corners of the chambers and opening into the bore below said chamber and next above said plate, and mechanism mounted on the plate for feeding square blanks through said slot; of an annular head slidably mounted within said bore, a round head coaxial with said bore and of a size to pass into said annular head, rods rising from said heads, cams acting on said rods to depress the round head far enough to push the blank into said hole and then to retract it to a position within the annular head and next to depress both heads far enough to push the blank through said hole and below the table-top, and means for holding the bent corners of the blank between the impulses of the round head and for releasing them upon the descent of the annular head.

12. In a bottle capping machine, the combination with an upright cylinder, a table having an opening with which the bore of said cylinder registers, said bore having a square chamber across it and the wall of the cylinder having a slot leading to said chamber, and means for feeding square blanks intermittently through said slot; of solid and annular heads within said cylinder, a solid rod rising from one head and a hollow rod rising from the other and inclosing the solid rod, oppositely projecting elbows at the upper ends of said rods carrying inwardly projecting pins, standards rising from said table, a power shaft journaled in the standards, and a cam rotated by said shaft and having grooves in its opposite faces engaging said pins, the cam-grooves being shaped in a manner to actuate the heads substantially as herein described.

13. In a bottle capping machine, the combination with a table having an opening, an upright cylinder having a round bore registering with said opening and a square chamber across the bore, the wall of the cylinder having a slot leading to said chamber, a round piston head, and means for reciprocating it within the bore and across said chamber; of an upright hopper alongside the cylinder and having a slot registering with that in such cylinder and laterally projecting guides in line with the slots, a plunger movable in said guides and across the bottom of the hopper, and means for reciprocating the plunger between the impulses of said head.

14. In a machine of the class described, the combination with a cylinder having a round bore with a square chamber across it, an annular head slidably mounted in said bore, a round head of a size to fit slidably within said annular head, and rods projecting from said heads out the upper end of the cylinder; of a rotary cam having in one face an elliptical groove whose high point at one end is farther from the center than that at the other, a roller traveling in this groove and connected with the rod of the round head, the cam having in the other face an irregular groove, and a roller traveling in this groove and connected with the other rod.

15. In a machine of the class described, the combination with a cylinder whose bore is round at one end and elsewhere larger and square, and means for feeding a pliable blank to said square portion; of a round head within said cylinder, means for moving it across said square portion and into said round portion, then retracting it, and on the next impulse moving it throughout the length of said round portion, and means for holding the upright corners of the blank between said impulses.

16. In a machine of the class described, the combination with a cylinder whose bore is round at one end and elsewhere larger and square, and means for feeding a pliable blank to said square portion; of a round head within said cylinder, means for moving it across said square portion and into said round portion, then retracting it, and on the next impulse moving it throughout the length of said round portion, radially movable dogs within said round portion opposite the corners of said square portion, and means for moving the tips inward over the upset corners of the blank as said head is retracted and moving them outward to release said corners as said head begins its second impulse.

17. In a machine of the class described, the combination with a cylinder whose bore is round at one end and elsewhere larger and square, and means for feeding a pliable blank to said square portion; of a round head within said cylinder, means for moving it across said square portion and into said round portion, then retracting it, and on the next impulse moving it throughout the length of said round portion, radially movable dogs within said round portion opposite the corners of said square portion, springs pressing said dogs normally inward over the corners of the blanks as upbent by the first impulse of said head, and means for automatically retracting the dogs as said head makes its second impulse.

In testimony whereof I have hereunto set my hand in presence of two subscribing witnesses.

GUSTAV G. LOEHLER.

Witnesses:
J. A. GREISBAUER,
C. E. HUNT.